Figure 1:
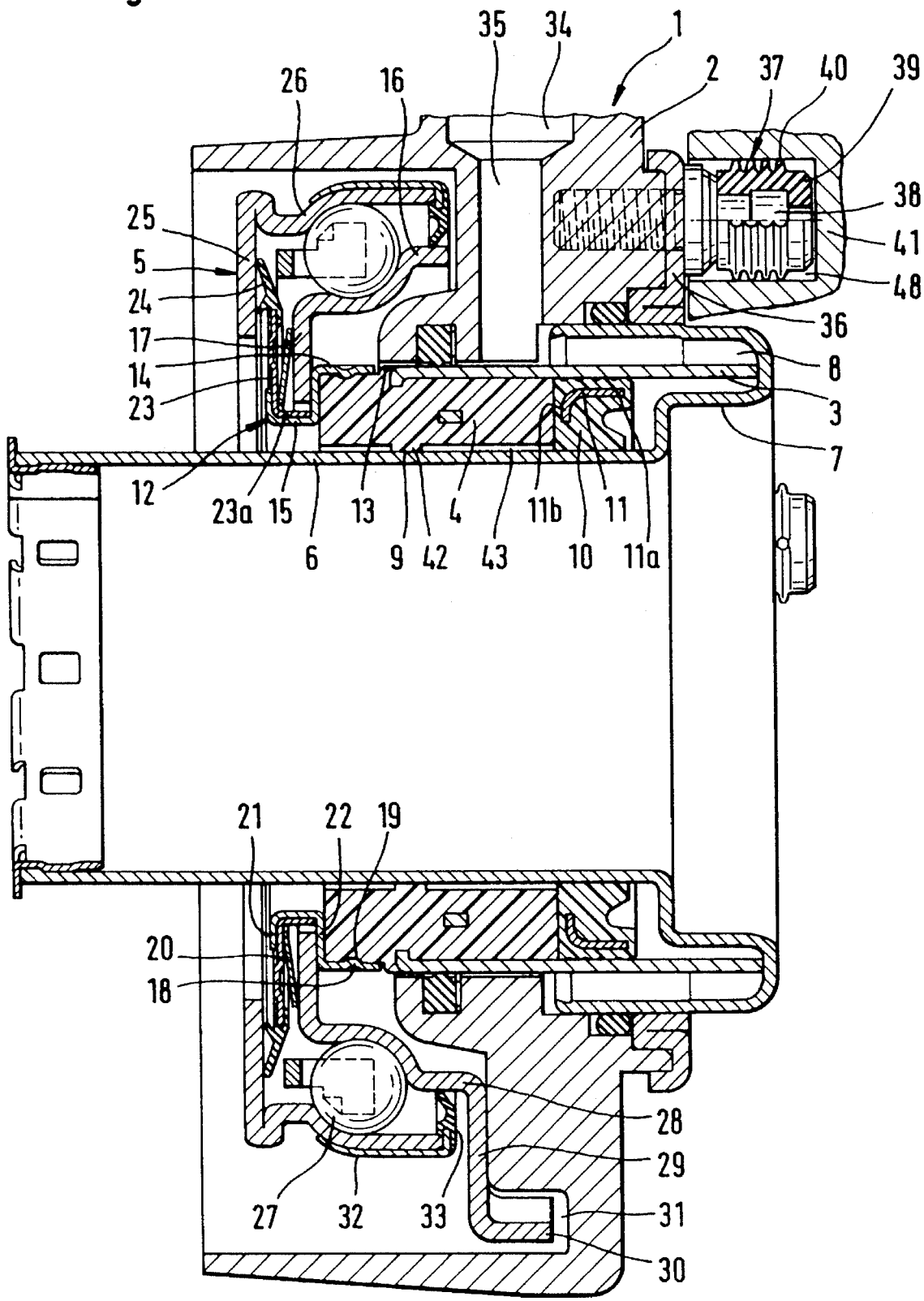

United States Patent [19]

Parzefall et al.

[11] Patent Number: 5,547,058
[45] Date of Patent: Aug. 20, 1996

[54] HYDRAULICALLY ACTUATABLE DEVICE FOR DISENGAGING A GEARSHIFT CLUTCH OF AN AUTOMOTIVE VEHICLE

[75] Inventors: Walter Parzefall, Bubenreuth; Herbert Folk, Burghaslach, both of Germany

[73] Assignee: INA Walzlager Schaeffler KG, Germany

[21] Appl. No.: 407,445

[22] Filed: Mar. 17, 1995

[30] Foreign Application Priority Data

Apr. 15, 1994 [DE] Germany .......................... 44 12 928.9

[51] Int. Cl.$^6$ .............................. F16D 23/14; F16D 25/06
[52] U.S. Cl. .................... 192/85 CA; 192/91 A; 192/98
[58] Field of Search ............... 192/85 CA, 91 A, 192/98

[56] References Cited

U.S. PATENT DOCUMENTS

| | | | |
|---|---|---|---|
| 4,606,449 | 8/1986 | Lederman | 192/91 A |
| 4,637,505 | 1/1987 | Huber | 192/85 CA X |
| 4,938,332 | 7/1990 | Thomas et al. | 192/85 CA |
| 5,287,951 | 2/1994 | Voit et al. | 192/85 CA |

OTHER PUBLICATIONS

Copy of Gebrauchsmuster, No. G 93 13 667.2, Sep. 8, 1993.

*Primary Examiner*—Richard M. Lorence
*Attorney, Agent, or Firm*—Bierman & Muserlian

[57] ABSTRACT

A hydraulically actuatable device (1) for disengaging a gearshift clutch of an automotive vehicle, having an annular piston (4) arranged for sliding displacement with its inner peripheral surface (9) on a guide sleeve (6) and its outer peripheral surface (13) in a clutch output cylinder (2), a release bearing (5) positionally fixed by a disc spring (20) being lodged in an end of the annular piston (4) away from a pressure chamber (8), characterized in that, there is arranged on end of the annular piston (4) a fixing ring (12) comprising a cylindrical portion (14) which engages around a part of the outer peripheral surface (13) of the annular piston (4) to which it is fixed by positive engagement, and a radially inwards oriented arm (17) of an inner ring (16) of the release bearing (5) engages into a portion (15,45) of the fixing ring (12) having a U- or L-shaped cross-section and extending beyond end of the annular piston (4), arm (17) of the inner ring (16) being urged by the disc spring (20) supported on a first annular radial portion (21) of the fixing ring (12) against a second annular radial portion (22) thereof which bears against an end face of the annular piston (4).

5 Claims, 2 Drawing Sheets

5,547,058

HYDRAULICALLY ACTUATABLE DEVICE FOR DISENGAGING A GEARSHIFT CLUTCH OF AN AUTOMOTIVE VEHICLE

A hydraulically actuatable device for disengaging a gearshift clutch of an automotive vehicle, having an annular piston arranged for sliding displacement with its inner peripheral surface on a guide sleeve and its outer peripheral surface in a clutch output cylinder, a release bearing positionally fixed by a disc spring being lodged in an end of the annular piston away from a pressure chamber is known from DE-U-93 13 557. This device already possesses a compact structure and favorable configuration from the manufacturing point of view.

OBJECTS OF THE INVENTION

It is an object of the invention to simplify the fixing of the release bearing on the annular piston while, at the same time, minimizing the axial dimensions of the release bearing.

This and other objects and advantages of the invention will become obvious from the following detailed description.

THE INVENTION

The novel hydraulically actuatable device of the invention for disengaging a gearshift clutch of an automotive vehicle, having an annular piston (4) arranged for sliding displacement with its inner peripheral surface (9) on a guide sleeve (6) and its outer peripheral surface (13) in a clutch output cylinder (2), a release bearing (5) positionally fixed by a disc spring (20) being lodged in an end of the annular piston (4) away from a pressure chamber (8), is characterized in that, there is arranged on said end of the annular piston (4) a fixing ring (12) comprising a cylindrical portion (14) which engages around a part of the outer peripheral surface (13) of the annular piston (4) to which it is fixed by positive engagement, and a radially inwards oriented arm (17) of an inner ring (16) of the release bearing (5) engages into a portion (15,45) of the fixing ring (12) having a U-or L-shaped cross-section and extending beyond said end of the annular piston (4), said arm (17) of the inner ring (16) being urged by the disc spring (20) supported on a first annular radial portion (21) of the fixing ring (12) against a second annular radial portion (22) thereof which bears against an end face of the annular piston (4).

This object is achieved by the fact that, on the end of the annular piston, there is arranged a fixing ring comprising a cylindrical portion which engages around a part of the outer peripheral surface of the annular piston to which it is fixed by positive engagement, and a radially inwards oriented arm of an inner ring of the release bearing engages into a portion of the fixing ring having a U- or L-shaped cross-section and extending beyond said end of the annular piston, said arm of the inner ring being urged by the disc spring supported on a first annular radial portion of the U-shaped portion against a second annular radial portion thereof which bears against an end face of the annular piston.

Thus, the inner ring, made preferably by chipless shaping, is bent inwards at an angle to form a disc-shaped arm whereby the entire release bearing is fixed in the fixing ring. Prior to its mounting, the release bearing is inserted together with the disc spring into the fixing ring whose outer edge is then bent at an angle to obtain the U-shaped configuration. The unit thus formed is then pushed over a part of the outer peripheral surface of the annular piston onto which it snap-locks. In addition to the already mentioned compact structure of the release bearing, this arrangement has the advantage that in contrast to prior art structures, a flat disc spring can be used and this disc spring is not supported directly on the annular piston which is preferably made of a plastic material. The entire structural unit is easy to mount and dismount.

In a further advantageous embodiment of the invention, an outer ring of the release bearing comprises a radially inwards oriented disc-shaped pressure section against which a sealing ring having at least one sealing lip bears, said sealing ring being carried by a retaining cap fixed in the U-shaped portion of the fixing ring. Thus, the fixing ring additionally serves as a carrier for the sealing ring which can advantageously act on a relatively large, axially extending sealing surface.

The retaining cap can have an angled edge matched to the contour of the U-shaped portion and arranged between the disc spring and the fixing ring. In this way, the interengagement of the individual components again leads to a reduction of the design space requirement. The retaining cap may also be made U-shaped and overlap a corresponding portion of the fixing ring which receives the arm of the inner ring and the disc spring.

The inner peripheral surface of the fixing ring can comprise fixing knobs which engage into the annular piston. These knobs can be made by stamping or die forming etc. and engage into corresponding countersinks of the annular piston.

Finally in another embodiment of the invention, axially oriented lugs extend from the outer periphery of the inner ring of the release bearing and engage positively with a housing of the device to prevent rotation. A plurality of such lugs, spaced over the periphery, extend therefrom at first radially outwards and then in an axial direction. These lugs engage into recesses of the housing which is preferably made of a plastic material. In this way, a rotation of the inner ring is prevented by simple means.

Referring now to the drawings.

Figure 2:
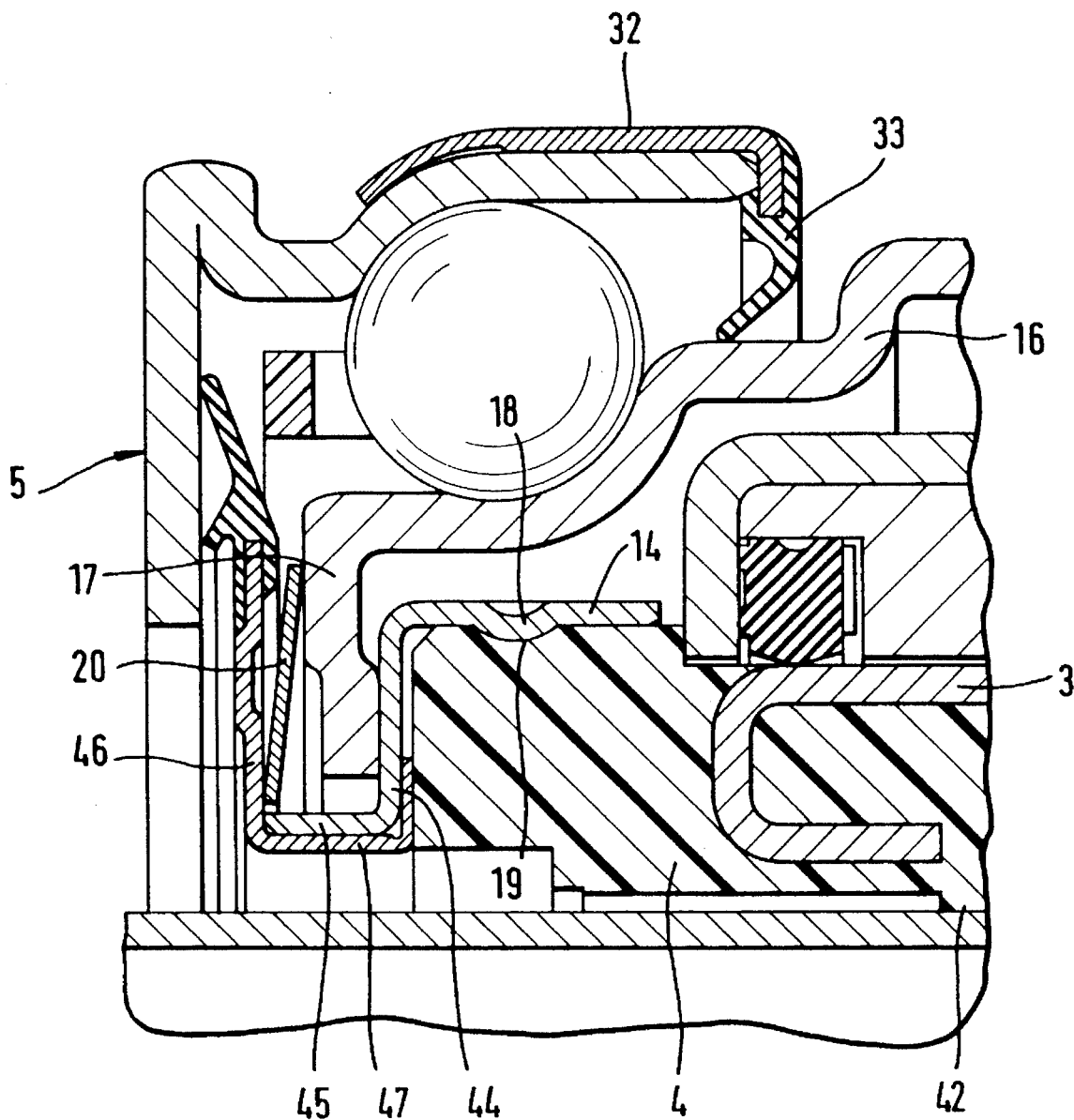

FIG. 1 is a longitudinal cross-section through a part of an actuating device of the invention having a U-shaped fixing ring, FIG. 2 is a longitudinal cross-section through a region of a release bearing showing a U-shaped retaining cap overlapping a fixing ring.

In FIG. 1, a device for disengaging a gearshift clutch, not shown, of an automotive vehicle is referenced at 1 and comprised essentially of a housing 2 forming a clutch output cylinder, a sheet-metal bush 3, an annular piston 4 and a release bearing 5. A guide sleeve 6 is inserted into the housing 2, and a crimped edge of this guide sleeve 6 forms a lodging 7 for a radial sealing ring, not shown, while a pressure chamber 8 is formed between the guide sleeve 6 and the output cylinder 3. The annular piston 4 is guided by its inner peripheral surface 9 on this guide sleeve 6, while an end face of the annular piston 4 bears against a sealing ring 10 made in the form of a grooved ring. This sealing ring 10 comprises an armoring 11 with whose help the sealing ring 10 bears under an outwardly directed radial pre-tension against the sheet-metal bush 3. A part of this sheet-metal bush 3 is sprayed-over with the material of the annular piston 4 and therefore participates in the common axial movements of the annular piston 4 and the sealing ring 10 caused by a pressure medium. Seen in the cross-sectional direction of the sealing ring 10, the armoring 11 is L-shaped having a longitudinal arm 11a and a transversal arm 11b arranged respectfully adjacent to the sheet-metal bush 3 and the end face of the annular piston 4.

At the end away from the sealing ring 10, the annular piston 4 receives a fixing ring 12, a cylindrical portion 14 of which engages around a part of the outer peripheral surface 13 of the annular piston 4 starting from an end thereof. This cylindrical portion 14 of the fixing ring 12 merges into a U-shaped portion 15 in which the release bearing 5 is fixed. For this purpose, an inner ring 16 of the release bearing 5 comprises a radially inwards oriented disc-shaped arm 17 which is inserted into the U-shaped portion 15.

The U-shaped portion 15 is supported on an end face of the annular piston 4, while the cylindrical portion 14 of the fixing ring 12 is locked into recesses 19 of the annular piston 4 by means of inner fixing knobs 18. An axial positional fixing of the release bearing 5 on the annular piston 4 is assured, in the last analysis, by the fact that a disc spring 20 which is likewise inserted into the U-shaped portion bears against a first annular radial portion 21 of the U-shaped portion 15 and thereby urges the inner ring 16 against a second annular radial portion 22.

Further, in this example of embodiment, a retaining cap 23 having an axially extending flange 23a is arranged within the U-shaped portion 15 an receives on its other end, a sealing ring 24 comprising two sealing lips. This sealing ring 24 cooperates with a disc-shaped pressure section 25 of an outer ring 26 of the release bearing 5.

The part of the inner ring 16 which forms a raceway for the rolling elements 27 merges into an axial part 28 which continues into peripherally spaced radial and axial lugs, 29 and 30 respectively. The axial lugs 30 engage positively into recesses 31 of the housing 2 and thus secure the inner ring 16 against rotation. The outer ring 26 is surrounded by a sealing cap 32 which receives a seal 33, a sealing lip of which bears against the periphery of the axial part 28 of the inner ring 16.

A pressure medium connection 34 provided in the housing 2 merges into a radial canal 35 opening into the pressure chamber 8. A duct, not shown, can be inserted by screwing or casting into this pressure medium connection 34.

A radial flange 36 is made integrally by welding, soldering or another joining method on the guide sleeve 6 and connected to the housing by screws 37. After fixing of the radial flange 36 on the housing 2, these screws 37, which have a peg-like head 38 and a slot for the application of a tool, are covered with a cap 39 of an elastic material, preferably rubber. These screws 37 are preferably provided on the periphery of the housing 2. The periphery of the cap 39, in its turn, comprises ribs 40. With the help of the peg-like heads 38 of the screws 37, the entire device 1 is fixed in a gearbox casing or clutch housing 41, of which only a part in the region of a pocket bore 48 is shown in FIG. 1.

Thus, with this method of fixing, no separate fixing screws are required for fixing the device 1 in a gearbox casing or clutch housing 41 and, when wear of the guide sleeve 6 occurs, this device has the advantage over hitherto known devices that the guide sleeve 6 can be replaced in a simple and inexpensive manner.

As can be further seen from FIG. 1, the annular piston 4 comprises in its central region, a radially inwards directed extension 42 by means of which it slides on the guide sleeve 6. This extension 42 serves additionally as a wiper for the guide sleeve 6 to remove dirt therefrom. A grease chamber 43 formed between the extension 42 and the sealing ring 10 is intended to prevent a penetration of dirt particles and damage to the sealing ring 10.

Insofar as the configuration of the device of FIG. 2 is identical to that of FIG. 1, it will not be described here. The only difference consists in that the end region 45 of the fixing ring 44 has an L-shaped cross-section. The arm 17 of the inner ring 16 is received in this region. A U-shaped portion 47 of a retaining cap 46 overlaps the arm 17 and the flat disc spring 20.

Various modifications of the device of the invention may be made without departing from the spirit or scope thereof and it is to be understood that the invention is intended to be limited only as defined in the appended claims.

What we claim is:

1. A hydraulically actuatable device (1) for disengaging a gearshift clutch of an automotive vehicle, having an annular piston (4) arranged for sliding displacement with its inner peripheral surface (9) on a guide sleeve (6) and its outer peripheral surface (13) in a clutch output cylinder (2), a release bearing (5) positionally fixed by a disc spring (20) being lodged in an end of the annular piston (4) away from a pressure chamber (8), characterized in that, there is arranged on said end of the annular piston (4) a fixing ring (12) comprising a cylindrical portion (14) which engages around a part of the outer peripheral surface (13) of the annular piston (4) to which it is fixed by positive engagement, and a radially inwards oriented arm (17) of an inner ring (16) of the release bearing (5) engages into a portion (15,45) of the fixing ring (12) having a U- or L-shaped cross section and extending beyond said end of the annular piston (4), said arm (17) of the inner ring (16) being urged by the disc spring (20) supported on a first annular radial portion (21) of the fixing ring (12) against a second annular radial portion (22) thereof which bears against an end face of the annular piston (4).

2. A device of claim 1 wherein an outer ring (26) of the release bearing (5) comprises a radially inwards oriented disc-shaped pressure section (25) against which a sealing ring (24) having at least one sealing lip bears, said sealing ring (24) being carried by a retaining cap (23, 46) fixed in the U-shaped portion (15) or on the L-shaped portion (45) of the fixing ring (12 or 44).

3. A device of claim 2 wherein the retaining cap comprises an axially extending flange (23a) which is matched to the contour of a U-shaped portion (15) and fixes the retaining cap to the fixing ring (12), said axially extending flange (23a) being arranged between the disc spring (20) and the fixing ring (12).

4. A device of claim 1 wherein an inner peripheral surface of the fixing ring (12,44) comprises fixing knobs (18) which engage into the annular piston (4).

5. A device of claim 1 wherein axially oriented lugs (30) extend from an outer periphery of the inner ring (16) of the release bearing (5) and engage positively with a housing (2) of the device (1) to prevent rotation.

* * * * *